UNITED STATES PATENT OFFICE.

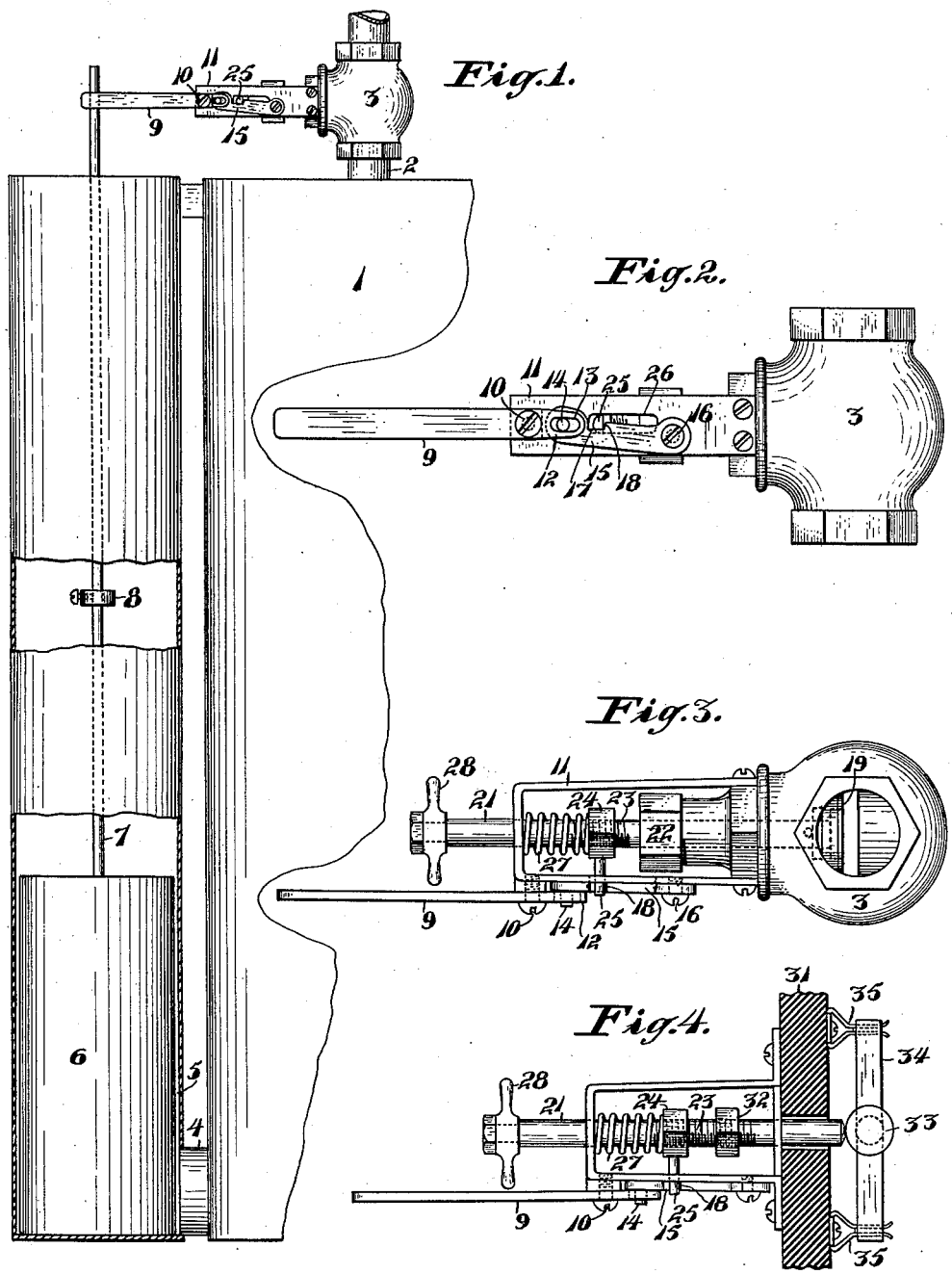

JOHN KING, OF OAKLAND, CALIFORNIA, ASSIGNOR OF ONE-HALF TO BUD J. PETERS, OF OAKLAND, CALIFORNIA.

FLOAT-OPERATED SHUT-OFF.

1,085,689.  Specification of Letters Patent.  Patented Feb. 3, 1914.

Application filed May 1, 1913. Serial No. 764,820.

*To all whom it may concern:*

Be it known that I, JOHN KING, a citizen of the United States, residing at Oakland, in the county of Alameda and State of California, have invented new and useful Improvements in Float-Operated Shut-Offs, of which the following is a specification.

The present invention relates to means for automatically arresting the flow of a fluid when liquid in a vessel has attained a predetermined level. The fluid thus arrested may be the same as the liquid in the vessel, as when a valve is used to stop the flow of said liquid into the vessel, or it may be a fluid as steam or electricity used to operate a pump or other motor to supply liquid to the vessel. I herein show two examples of the use of my improved device, one in which a valve is operated arresting the flow of liquid into a vessel and the other in which a switch is operated to break an electric circuit employed to pump the liquid into the vessel.

The object of my invention is to provide a device of this character which shall be so constructed that it may be attached to an ordinary float valve, with practically no change, or to an ordinary electric switch.

In the accompanying drawing, Figure 1 is a vertical sectional view of an apparatus in which my invention is used; Fig. 2 is an enlarged side view of the invention detached; Fig. 3 is a plan view thereof; Fig. 4 is a view similar to Fig. 3 showing a modified form of the invention.

Referring to the drawing, 1 indicates a vessel into which water is conducted by a pipe 2 having therein a valve 3. Said vessel connects at the bottom with a pipe 4 leading to a float chamber 5, in which is a float 6 having a stem 7 extending upwardly from the top, upon which stem is adjustably secured a collar 8. As the level of the water in the vessel and in the float chamber rises, the float, stem and collar also rise, until, when a level has been reached, which has been determined by the adjustment of the collar 8 upon the stem 7, said collar abuts against the long arm of a tripping lever 9, pivoted at 10 upon a U-shaped support 11 secured to the casing of the valve, whereupon said long arm rises and a short arm 12 of said lever descends. Said short arm is formed with a slot 13 through which passes a stud 14 projecting outwardly from the free end of a latch 15 pivoted at 16 upon said support 11. The upper edge of said latch is formed with a depression 17 and a shoulder 18.

Closing the opening of a valve 2 is a disk 19 loosely supported upon the inner end of a stem 21 which passes through a stuffing box 22 and through the outer end of the U-shaped support 11. A threaded portion 23 of said stem is screwed through a nut 24, from which a stud 25 extends through a long slot 26 in a side of the U-shaped support 11 and substantially at the same level as the upper edge of the latch 15 in its lower position corresponding to the raised position of the long end of the arm of the tripping lever 9. A coiled spring 27 around the stem 21 is compressed between the outer end of said U-shaped support 11 and the nut 24. On the outer end of said stem is secured a handle 28.

The valve is opened by pulling the stem 21 by means of the handle 28 against the spring 27. The nut 24 is thereby moved rearwardly with the stem 21 and the stud 25 is moved away from the valve to such a position that the latch 15 can rise, so that the shoulder 18 is in front of said stud 25. Said latch will then so rise, being raised by the descent of the long arm of the lever 9, said long arm being permitted to descend if the collar 8 does not contact therewith, that is, if the level of the water in the float chamber is sufficiently low. Thereupon, upon releasing the pulling force from the handle 28, the shoulder 18 will arrest the stud 25 and the nut 24, and the parts will remain in this position, the water flowing through the valve, until a predetermined level has been attained in the vessel 1 and in the float chamber 5. When the water reaches such level, the collar 8 will raise the long arm of the tripping lever 9, and depress the latch 15, releasing the stud 25, whereupon the spring will act to close the valve.

It will be observed that my invention differs from the ordinary float valve in that the passage for the water is not opened automatically when the level of the water in the vessel is lowered from any cause.

An important feature of my invention is the provision which I make for varying the force of the spring and the size of the opening through which the water flows when the valve is opened. This is done by turning the stem 21 by means of the handle 28. The nut 24, not turning with the stem, is by said turning movement moved longitudinally relatively to the stem.

In the form of the invention shown in Fig. 4, the support 11 is secured to a switch board 31, and the stem 21, slides through a hole in the switch board, in the circuit of an electric motor, not shown, operating a pump for supplying water to the vessel 1, the motion of the stem being arrested by a nut 32 screwed on said stem. The working end of the stem, projecting through the switch board, can contact with the handle 33 of a knife switch 34. When the water in the vessel reaches a predetermined level, the stem 21 is released from the latch, and is moved toward the switch board by the spring 27, and separates the knife switch 34 from the contact 35. I thus provide an automatic attachment which is, so to speak, complete in itself, that is, it can be connected to a fluid controlling means, such as a globe valve or an electric switch, without any other support than that of the valve casing or the switch itself.

I claim:—

In combination with a union for fluid conductors, and means for controlling the flow of the fluid therethrough, a device for operating said means, comprising a U-shaped support, the ends of which are attached to said union, a rod for actuating the fluid-controlling means, and slidable through the central member of said support, and having a threaded portion, a nut screwed upon said threaded portion, a coiled spring around said rod and compressed between said nut and the central member, one of the side members of the support having a longitudinal slot therein, a stud secured to the nut and extending through said slot, a latch pivoted upon said member, and having a shoulder adapted to be engaged by the extending end of the stud, and a tripping lever pivoted on said side member, and having a pin and slot connection with the free end of the latch to move the latter to a position in which said stud engages said shoulder.

In testimony whereof I have hereunto set my hand in the presence of two subscribing witnesses.

JOHN KING.

Witnesses:
F. M. WRIGHT,
D. B. RICHARDS.

---

Copies of this patent may be obtained for five cents each, by addressing the "Commissioner of Patents, Washington, D. C."